United States Patent
Handley et al.

(10) Patent No.: US 6,621,498 B1
(45) Date of Patent: Sep. 16, 2003

(54) HIGH-SPEED NON-SEPARABLE COLOR TABLE LOOKUP

(75) Inventors: John C. Handley, Fairport, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 406 days.

(21) Appl. No.: 09/703,749

(22) Filed: Nov. 1, 2000

(51) Int. Cl.[7] .............................. G09G 5/06; G06T 5/00
(52) U.S. Cl. ....................................... 345/604; 345/601
(58) Field of Search ................................ 345/600, 601, 345/602, 604; 358/3.23

(56) References Cited

U.S. PATENT DOCUMENTS

| | | | |
|---|---|---|---|
| 4,992,861 A | | 2/1991 | D'Errico |
| 5,652,831 A | * | 7/1997 | Huang et al. ............... 345/604 |
| 5,748,195 A | * | 5/1998 | Nin ............................. 345/604 |
| 5,802,219 A | | 9/1998 | Farkas et al. |
| 5,880,738 A | * | 3/1999 | Donelly ....................... 345/604 |

OTHER PUBLICATIONS

Peter Bosch, Niels Nes, Martin Kersten, Navigating through a Forest of Quad Trees to Spot Images in a Database, CWI, Centrum voor Wiskunde en Informatica, INS–R0007 Feb., 29, 2000, pp. 1–9.*

* cited by examiner

Primary Examiner—Jeffery Brier
(74) Attorney, Agent, or Firm—Fay, Sharpe, Fagan, Minnich & McKee, LLP

(57) ABSTRACT

A method of color transformation is based on non-separable tiling of a color transformation lookup table. Non-separable tiling allows the lookup table to have fine granularity where it is needed or desired and coarse granularity where it can be tolerated. Therefore, non-separable tiling of the lookup table provides improved transformation quality for a given lookup table size. The non-separable tiles are enumerated. An appropriate tile is selected for use in a color transformation by finding an intersection between lists of tiles associated with each value that comprises a particular pixel. In one embodiment, a tile or transformation rule is associated with bit position in a bit vector. Any particular parameter value may be associated with one or more tiles or transformation rules. Therefore, a particular bit vector associated with a particular parameter value may have a plurality of set bits.

23 Claims, 7 Drawing Sheets

```
             1 1 1 1 1 1 1 1 1 1 2 2 2 2 2 2 2 2 2 2 3 3 3 3
     1 2 3 4 5 6 7 8 9 0 1 2 3 4 5 6 7 8 9 0 1 2 3 4 5 6 7 8 9 0 1 2 3
X3:  (1,0,1,0,0,0,0,0,0,0,1,0,0,0,0,1,0,0,0,0,0,1,0,0,0,0,0,0,0,0,0,0,0)
Y2:  (1,1,0,0,0,0,1,0,0,0,0,0,0,1,1,0,0,0,0,0,0,0,0,0,1,1,0,0,0,0,0,0,0)
     ↓ AND
Ind: (1,0,0,0,0,0,0,0,0,0,0,0,0,0,0,0,0,0,0,0,0,0,0,0,0,0,0,0,0,0,0,0,0)
```

730

710 — X3  
720 — Y2  
740 — Ind

FIG. 7

HIGH-SPEED NON-SEPARABLE COLOR TABLE LOOKUP

BACKGROUND OF THE INVENTION

1. Field of the Invention

The invention relates to the art of color image processing. For example, it finds application where an image created on, or prepared for rendering on, a first or source device is prepared for rendering on a second or destination device.

2. Description of Related Art

When an image is prepared for rendering on an electronic device the image is represented as a set of pixels. Each pixel describes a small portion of the image in terms of colorant pixel values for the colorants available on the rendering device. For example, typically a cathode ray tube (CRT) based computer display screen is comprised of red (R), green (G) and blue (B) phosphors. An image prepared for display on a CRT is described with a set of pixels. Each pixel describes the intensity with which the red, green and blue phosphors are to be illuminated on a small portion of the CRT. A similar procedure is followed when an image is prepared for rendering on a printing device. Currently, at least some color printing devices apply cyan (C), magenta (M), yellow (Y), and sometimes black (K) colorants to a print medium, such as paper or velum, in order to render an image. Such printing devices are said to operate in a CMY or CMYK color space. When an image is prepared for rendering on a color-printing device, the image is represented as a set of pixels. Each pixel describes a small portion of the image by calling for an appropriate mixture of the available colorants. Typically, the pixel value for each colorant can range from 0 to 255. The higher a colorant's pixel value is, the more of that colorant the color image processor applies to the print medium. In a system employing 8-bit precision for the colorant signals, the number 255 represents the maximum or fully saturated amount of colorant. The number 0 is used when none of a particular colorant is required.

In a CRT operating in RGB (red, green blue) space, fully saturated red is described by a pixel calling for R=255, G=0, B=0. In a printer operating in CMYK (cyan, magenta, yellow, black) space, fully saturated red is described by a pixel calling for C=0, M=255, Y=255, K=0. Magenta and yellow colorants combine through simple subtractive mixing and are perceived as red. There is no guarantee that the red described in RGB space and displayed on the CRT is the same red described in CMYK space and printed on a page. In fact, it is quite likely that the spectral properties of the red phosphor used in the CRT will be different than the spectral properties of the subtractively mixed magenta and yellow colorants of a particular printer.

As mentioned above, the CRT and the CMYK printer use different materials to generate the perception of color. The materials used impact a set of colors that each device can reproduce.

The set of colors a device can produce is referred to as the color gamut of the device. There is no guarantee that a color that can be produced by a first device is within the color gamut of a second device. This is even true when both devices are CMYK printers.

Where color matching is required between two devices such as the CRT operating in RGB space and the printer operating in CMYK space, transforms based on calibration and measurement are required. In such a situation it is possible, for example, that the pure red RGB CRT pixel mentioned above, is mapped to a CMYK printer pixel calling for a less than fully saturated magenta component and a small amount of a cyan component. For example, the CMYK version of the original RGB red pixel referred to above might call for C=27, M=247, Y=255, K=0. Furthermore, if one wants to print a copy of the original pure red RGB CRT pixel on a second printer it is quite likely that a second transform will have to be used. That transform may translate the original RGB CRT pixel to a second CMYK pixel. For example, the second transform may map the original RGB CRT pixel to a second CMYK pixel calling for C=20, M=234, Y=240, K=35. One reason two different CMYK printers may require different transforms is that different printers use different colorants. For example, a first magenta colorant used in a first printer may have a different spectral content than a second magenta colorant used in a second printer. Likewise, a first yellow colorant used in a first printer may have a different spectral content than a second yellow colorant used in a second printer.

From the foregoing discussion it can be seen that an image prepared for rendering on a first device may need to be transformed if it is to be properly rendered on a second device. Such a transformation is an attempt to emulate the first or source device onto the second or destination device. In order to achieve calorimetric content matching, the emulation of the color gamut of the CRT on the first CMYK printer caused the red CRT pixel to be mapped to a first CMYK pixel calling for C=27, M=247, Y=255, K=0. The emulation of the color gamut of the CRT on the second CMYK printer caused the red CRT pixel to be mapped to the second CMYK pixel calling for C=20, M=234, Y=240, K=35. Obviously, therefore, even where there is no RGB CRT image involved, an image prepared for printing on the first printer may have to be transformed before its spectral content can be matched on the second printer. In such a situation the first printer is said to be emulated on the second printer.

For example, when, a photographic image has been prepared for rendering on a first CMYK device, for example a Standard Web Offset Printing (SWOP) device, but must then be rendered on a second CMYK device, for example, a xerographic printer, a "4 to 4" transform is typically used to emulate the first device on the second device.

An image processor must be able to satisfactorily transform images, prepared for rendering on a staggeringly large number of source devices, for rendering on an equally large number of rendering devices. For example, a personal computer, configured to operate as an image processor, through the use of, for example, a web browser, word processor, or desktop publishing software, must be able to accept images created or downloaded from almost anywhere, and render the images pleasingly on any image output terminal the user connects to the personal computer. For example, the image processor must be able to pleasingly display images on a computer screen and send commands to have images rendered pleasingly on any printer the user connects to the personal computer. Similarly, document processors and copiers must transform images pleasingly and accurately. Indeed in document processors and copiers, color accuracy requirements can be very stringent. For example, in a large print job, comprising a corporate sales presentation, it is very important that colors in a company logo be reproduced accurately and consistently. Similarly, colors in a clothing catalog must match the colors on depicted garments.

Typically transformations are carried out through the use of look up tables. For example, an image prepared for rendering in a RGB color space of a computer monitor, is transformed into a CMYK color space of a printer, through the use of a three-dimensional look up table. Each of the RGB parameters is used as an axis or index into the look up table. The RGB parameters are typically represented by 8-bit values for each of the R, G, and B components. Such a 24-bit RGB vector is capable of addressing over 16.77 million locations or describing over 16.77 million colors. However, look up tables of this size are prohibitively expensive and physically impractical. Therefore, such looks look up tables are typically partitioned into a smaller size, such as, for example, 16×16×16 (4096) table locations or nodes. Each node stores, for example, a CMYK value. CMYK values of points not directly represented by nodes, are determined by a form of interpolation among nodes of the look up table (LUT).

An illustration of the operation of a prior art look up table is instructive. Referring to FIG. 1, an input RGB value is used to determine index values r, g, b into the table 112. The index values are used to locate the transformation data within the table. For example, the index values corresponding to a point 116 do not coincide with any node location 120. Therefore, a transformation value is not directly available from the table 112. Instead, the conversion is accomplished by interpolating between the CMYK values stored in nodes 124 corresponding to the point 116. For example, the nodes 124 correspond to the point 116 because they are the nodes 124 nearest the input point 116. The input RGB color is defined in three dimensions. Therefore, the interpolation is done in three dimensions. Common examples of 3-D interpolation techniques include trilinear, tetrahedral, and prism interpolation. Of these, tetrahedral interpolation is the fastest method, requiring interpolation only among 4 nodes. (The trilinear and prism schemes utilize 8 and 6 nodes, respectively.) All these techniques require several multiplication, addition, shift, and comparison operations for each output signal or parameter at each pixel; and are often implemented with special purpose hardware. This interpolated CMYK value is then output. Typically, the output is eventually rendered, for example, on a printer.

As depicted in FIG. 1, tiling in prior art look up tables is even and regular. That is to say, each tile is a cube, and the dimensions of each cube are the same. For example, each cube or tile is, four parameter value increments wide, four parameter value increments high, and four parameter value increments deep. Such a look up table includes 26,144 tiles or cubes arranged in a grid of 64×64×64 cubes or tiles. In other words, every fourth parameter value is represented by a node. For example, a red axis has a nodes at R=0, 12 . . . 251, 255. Likewise a green axis has nodes that G=0, 12 . . . 251, 255 and a blue axis has nodes at B=0, 12 . . . 251, 255. Those skilled in the art will recognize that determining which cube, tile, or nodes to use, in a prior art look up table, to determine a transformation value for a set of RGB parameter values is a trivial matter. For example, where the pixel parameter values are represented by eight bit words, an appropriate tile, is found by shifting the bits in the eight bit words. For example, R>>2, G>>2, B>>2 shifts bits representing an RGB parameter value, two positions to the right, leaving the six highest order bits in each parameter for use as an index or address an appropriate node. The two low order bits of the three values indicate the position corresponding to the input color description within the cube or tile. The low order bits are used in interpolating between the nodes of the cube or tile.

This indexing and tile accessing method is very fast. However, the speed comes at a price. In order to use this prior art indexing method, one is forced to quantize or tile a color space into equal, regularly sized and regularly shaped tiles. Furthermore, one is forced to use a fine quantization (small tile size) that ensures the required transformation accuracy is achieved throughout the look up table, even though some parts of the look up table may require only coarse quantization. This means that these prior art look up tables consume more memory than would otherwise be required.

BRIEF SUMMARY OF THE INVENTION

In order to reduce memory consumption while maintaining or even improving image transformation accuracy, a method and apparatus operative for transforming a description of a color from a first color space, defined by first color space parameters, into a second color space, defined by second color space parameters, has been developed. The method comprises the steps of examining a relationship between the first color space and the second color space, dividing the first color space into a plurality of tiles, each tile being of selected size and shape, the size and shape of each tile being based on the relationship between the first color space and the second color space, the tiles being defined by nodes, the nodes relating parameter values in the first color space to parameters values in the second colors space, and enumerating each tile.

Furthermore, one embodiment of the method is operative for transforming a description of a color from a first color space defined by first color space parameters to a second color space defined by second color space parameters. The embodiment of the method comprises the steps of examining a relationship between the first color space and the second color space, creating a set of transformation rules, each rule in the set operative over a particular region of the first color space, associating each rule with a bit position in a rule association vector template, associating each first color space parameter value with a particular rule association vector, setting bits in a particular rule association vector to associate a particular first color space parameter value with transformation rules that are operative over regions of the first color space that are associated with the particular first color space parameter value, selecting an image pixel describing a color in terms of a particular set of first color space parameter values for transformation into an image pixel describing a color in terms of a particular set of second color space parameter values, determining an intersection of rule association vectors of the particular set of first color space parameter values, and transforming the first color space parameter values into a set of second color space parameter values by following a transformation rule indicated by the intersection of rule association vectors.

Another aspect of the present invention is an image processor operative to transform a first image description, based in a first color space, described by a set of first color space parameters, into a second image description, based in a second color space, described by a set of second color space parameters. The image processor includes a set of transformation rules, and a set of rule association vectors. Each rule association vector is related to a particular first color space parameter value. Additionally, each rule association vector identifies particular transformation rules associated with the particular first color space parameter value. The image processor further comprises a transformation rule selector operative to use the rule association vectors to find an intersection of rules associated with a given set of first color space parameter values and to thereby select a rule for execution based on the intersection.

One advantage of the present invention resides in a reduction in memory required to store color transformation look up tables.

Another advantage of the present invention is found in design flexibility afforded by the freedom to use rule indexing transformation processes rather than being restricted to transformation by interpolation between look up table nodes.

Yet another advantage of the present invention is apparent in improved image transformations provided by an elimination of design compromise. Since fine look up table tiling or quantization can be used where needed and any extra memory used by the fine tiling can be compensated by using coarse tiling where coarse can be tolerated, fewer trade offs have to be made with regard to look up table quantization and required memory.

Yet another advantage of the present invention is that the method is performed in a deterministic number of steps. Appropriate transformation tiles are found in the same number of steps no matter what color is represented by an input color description or pixel.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

FIG. 7 is a diagram showing two bit vectors containing tile association information and a process for finding an intersection of those associations in order to generate an intersection indicating bit vector.

DETAILED DESCRIPTION OF THE INVENTION

Figure 1:
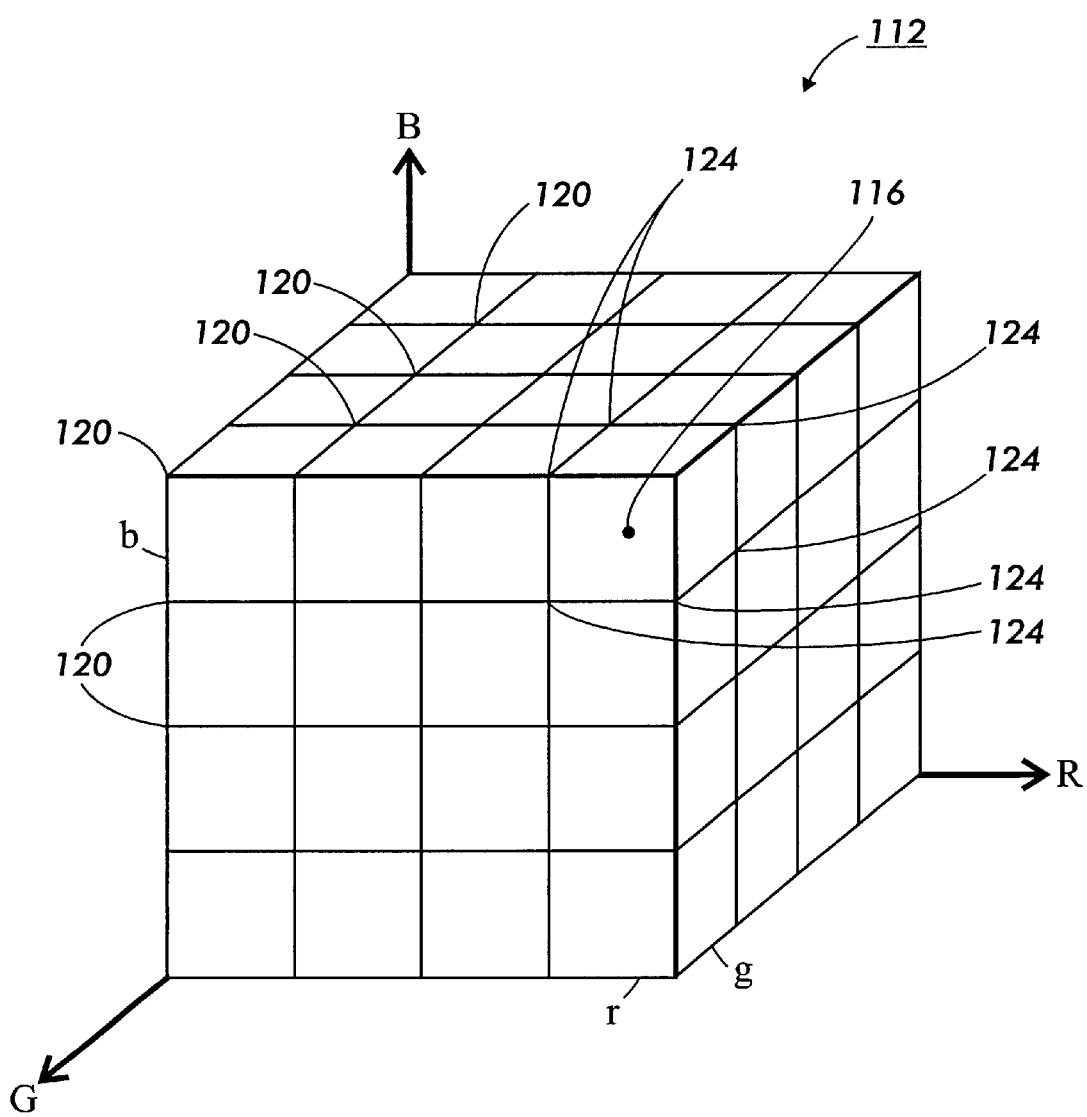
FIG. 1 is a depiction of a portion of a prior art look up table having separable tiling.
Figure 2:
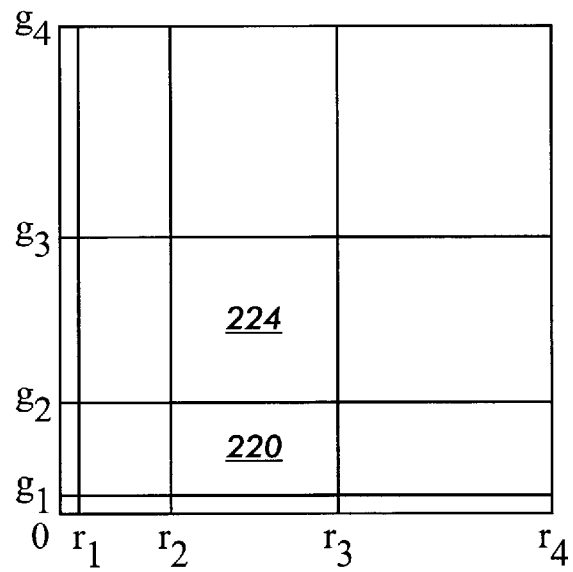
FIG. 2 is a depiction of a portion of a look up table having an improved separable tiling.

One step toward overcoming the disadvantage of wasted memory space in the prior art look up table, while maintaining a comparable access speed, is to use variable, yet still separable, tiling. For example, referring to FIG. 2, one face of a multi-dimensional look up table indexed with, for example RGB values, is partitioned unevenly, but separably. For example, the look up table is partitioned according to: $\{[0, r1],[r1+1, r2], \ldots, [rk, 255]\},\{[0, g1],[g1+1, g2], \ldots, [gm, 255]\},\{[0, b1],[b1+1,b2], \ldots, [bn, 255]\}$ where the color space parameters r1 ... rk, g1 ... gm, and b1 ... bn are not restricted to be evenly spaced or related to one another. Only one face of such a look up table is illustrated FIG. 2. Therefore the tiles are represented as two-dimensional rectangles. In actuality, the tiling consists of 3 dimensional rectangles: $\{[0,r1]\times[0,g1]\times[0,b1], [\{0,r1]\times[0, g1]\times[b1+1, b2], \ldots, [\{rk,255]\times[gm,255]\times[bn,255]\}$. Of course, if a first or input color space comprises four or more parameters, as in, for example, a CMYK color space or a HI-FI color space, the tiles of the look up table are thought of as hyper-rectangles. In the RGB example, each tile consists of separable Cartesian products of three intervals, one interval from each portioned axis. Tiles of this sort, illustrated in FIG. 2, are accessible in any of a number of ways. The method selected is usually dependent on architecture of a computing platform used. One method is to use a mechanism similar to tone reproduction curves. In this method color space parameter values are rescaled to compensate for the unequal node spacing along each look up table axis. Then a method similar to the bit shifting discussed in reference to the prior art look up table is applied.

The look up table described in reference to FIG. 2 uses memory somewhat more efficiently than does the prior art method. The memory savings is achieved with only a small increase in access time. Indeed, if the step of bit shifting is included in the values stored in the resealing tone reproduction type curves; the cost in access time can be almost negligible. For example, where separablity is maintained 3D tiles are products of three 1D tile sets (intervals). Thus, searching for the tile containing a given point (x, y, z) can be performed as three 1D search problems: search the first 1D tile set for the interval containing x (call it A), search the second 1D tile set for the interval containing y (call it B), and search the third 1D tile set for the interval containing z (call it C). The required 3D tile is the Cartesian product of A, B, and C: AxBxC, and is therefore identified simply by combining the results of three very fast searches.

Nevertheless, the method of FIG. 2 is still more restrictive than is desirable. For example, all tiles bounded by index or axis positions r2 and r3 are necessarily the same width. Additionally, all the tiles bounded by index or axis positions g2 and g3 are necessarily the same height. Therefore, for example, where a first tile 220 bound by r2 and r3 is preferably wide and a second tile 224 bound by r2 and r3 is preferably narrow, some less than ideal, compromise width, must be selected and used for both tiles. Therefore, memory is not conserved to the desired degree and/or desired transformation accuracy is not achieved to the degree.

Figure 3:
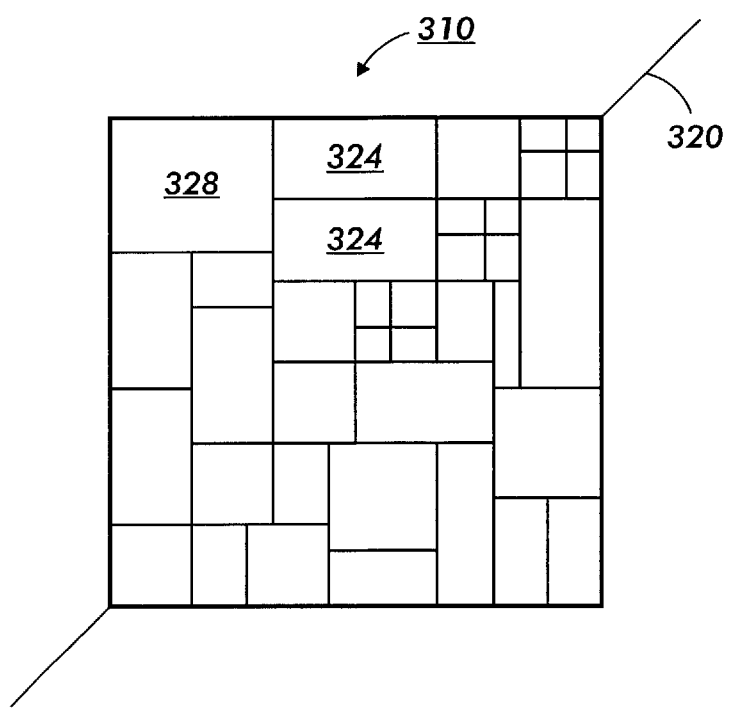
FIG. 3 is a depiction of a portion of a look up table that is not restricted to separable tiling.

Referring to FIG. 3 a more general and preferable tiling 310 includes, for example, rectangles (or hyper-rectangles) that are not necessarily separable Cartesian products of parameter ranges. By foregoing separability, the look up table designer is given complete freedom to use fine tiling where it is required, and course tiling where course tiling does not cause errors or where errors can be tolerated. For example, in a case involving printer correction look up tables, it is often desirable to more finely sample color space in regions near a neutral axis 320, while more course sampling suffices for less critical 324 or out-of-gamut 328 regions. Therefore, at least in the case of printer correction look up tables, being free to use non-separable tiling reduces look up table storage requirements, and/or improves look up table precision and accuracy. However, non-separable tiling has been difficult to use. For example, it is not possible to use the fast 1D searches described in reference to FIG. 2 where tiling is non-separable.

Therefore, until now, non-separable tiling has required a much slower more complicated accessing method. Elaborate chains of range tests and/or switch statements have been used to determine which tile to use to transform a particular set of pixel values. These techniques are slow and non-deterministic. The amount of processing time required to find an appropriate tile for transforming a particular set of parameter values varies depending on where in the list of ranges or where in a switch statement, a match for a particular set of pixel values is found. This has lead to the undesirable result that an amount of time required to transform an image varies depending on the colors that comprise the image. Furthermore, no matter what colors comprise an image, the amount of time required to transform the image, using look up tables tiled in a non-separable manner has been prohibitively time consuming.

Figure 4:
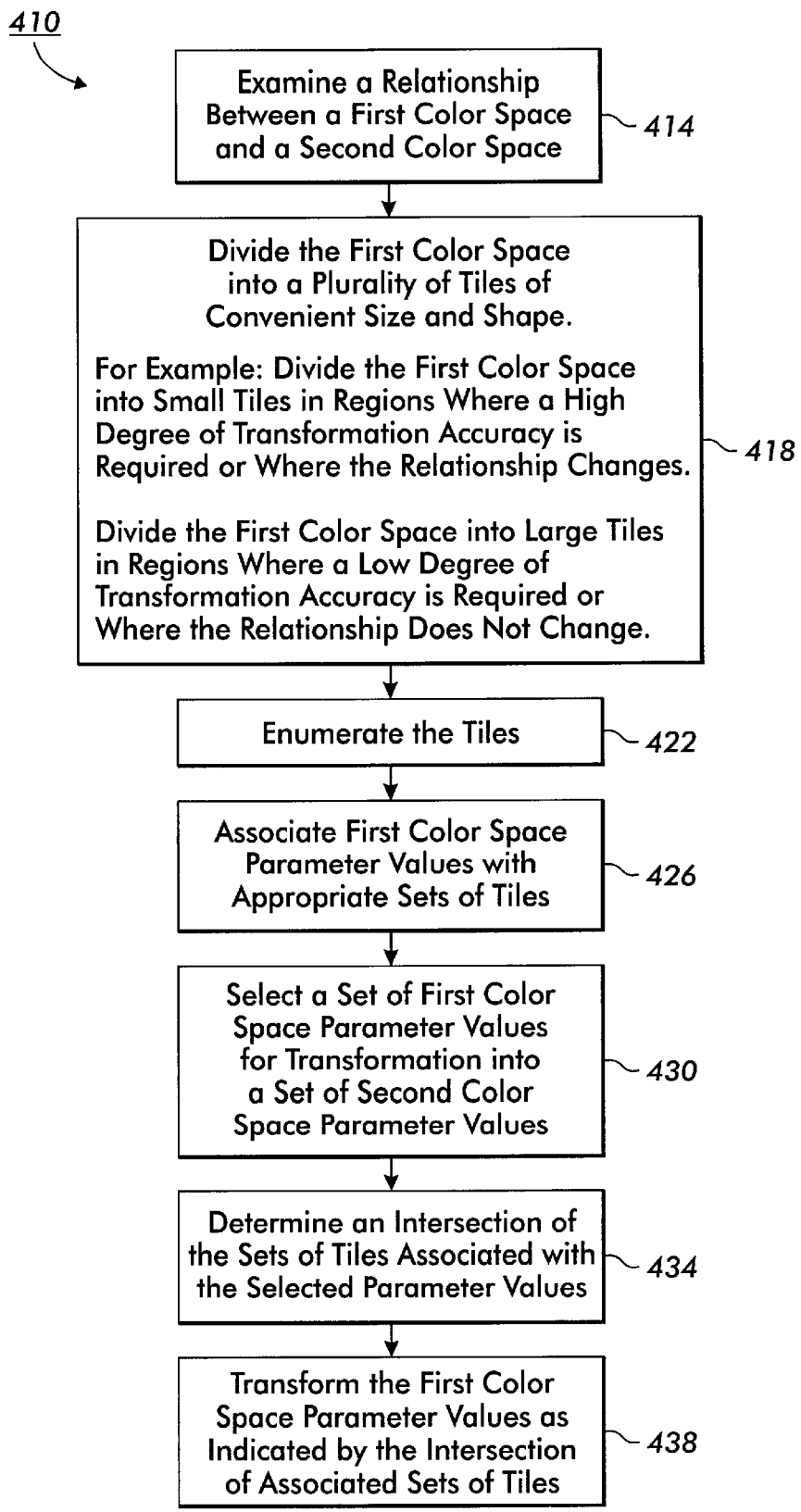
FIG. 4 is a flow chart outlining a method for using look up tables that are not restricted to separable tiling.

Now however, a fast method of using non-separably tiled look up tables has been developed. Referring to FIG. 4, a deterministic, high-speed method 410 for using non-separable tiling in color transformation look up tables includes a color space relationship examination step 414. In the color space relationship examination step 414 a look up table designer, or a look up table generation software module, examines a relationship between a first color space and a second color space. For example, a transformation relationship between the first color space and the second color space is analyzed. For example, regions where the relationship is relatively constant, and points where the relationship changes, are identified. Additionally points in the second color space that are unimportant are also identified. For example, regions in the first color space that correspond to regions in the second color space that are outside of, for example, a rendering device's color gamut, are identified.

In a color space division step 418, information discovered in the relationship examination step 414 is used to intelligently partition the first color space without regard to separability or tile uniformity. For example, in regions where the relationship between color spaces changes suddenly, the first color space is divided into a large number of small tiles. This achieves a fine quantization in this region and improves transformation accuracy. Regions of the first color space that correspond to points where the relationship between the color spaces is relatively constant are divided into large tiles. Additionally, regions of the first color space that correspond to unimportant regions of the second color space are also associated with large tiles.

Figure 5:
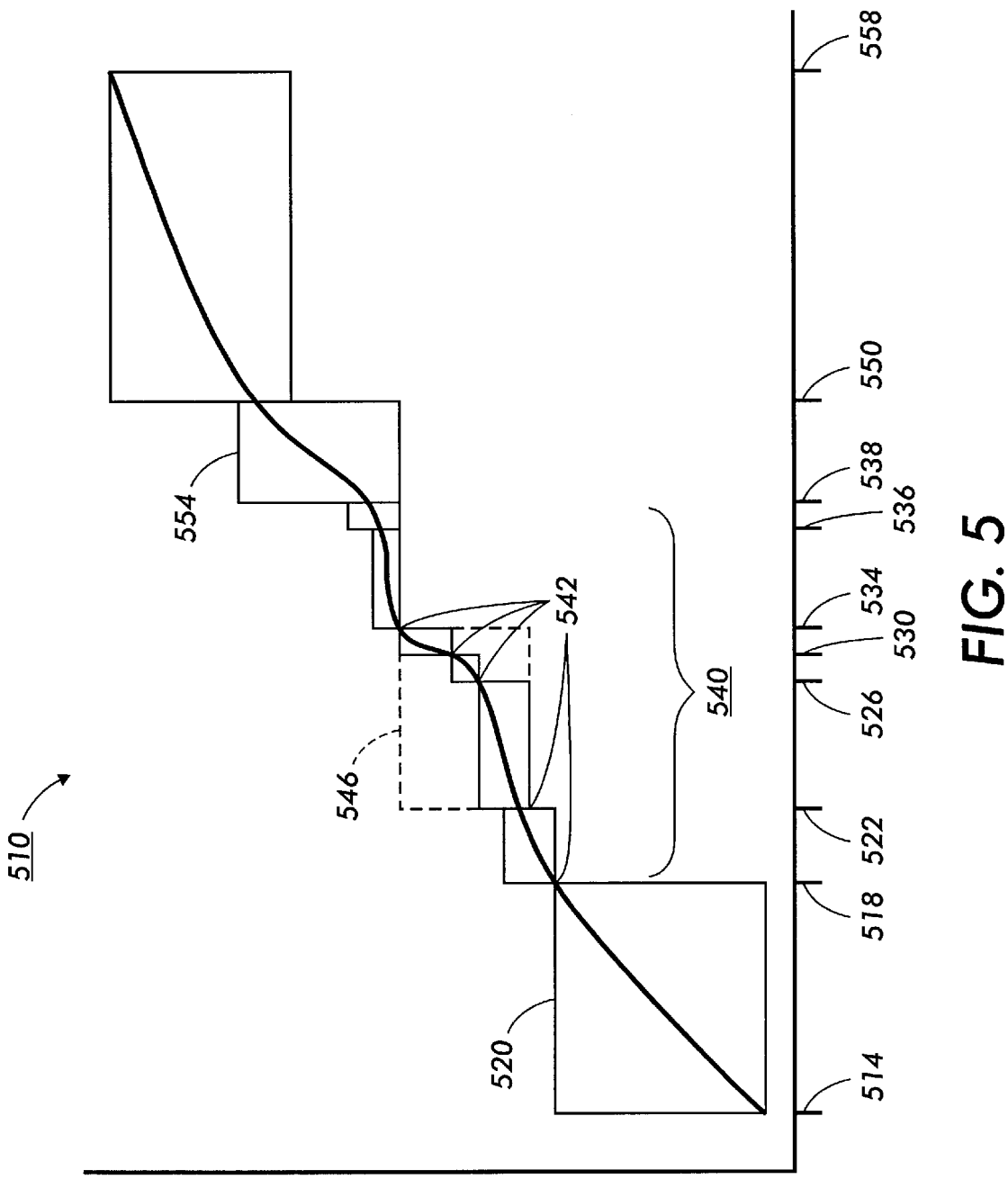
FIG. 5 is a graph showing an exemplary relationship between two colors spaces and tiling schemes associated therewith.

For example, referring to FIG. 5, the concepts discussed in reference to step 418 are illustrated with a simple two-dimensional description 510 of a relationship between a first colors space parameter and a second color space parameter. The first color space parameter is a red pixel value and the second color space parameter is a magenta pixel value. Between a first red value 514 and a second red value 518 the relationship between red and magenta is relatively constant. Therefore, even though the range between the first red value 514 and the second red value 518 is relatively large, one large tile 520 is all that is required to accurately represent the relationship and provide for accurate interpolated transformation values. However, near the second red value 518 the relationship between red and magenta changes. Additionally, the relationship changes several times in rapid succession near a third 522, forth 526, fifth 530, sixth 534, seventh 536 and eight 538 red values. The region of the first color space that includes the third 522, forth 526, fifth 530, sixth 534, seventh 536 and eight. 538 red values correspond, for example, to an important portion of the second color space. Therefore, small tiles 540 are used in this region to divide the first color space into regions that are accurately represented by, for example, nodes 542 of the tiles. If larger tiles, such as a dotted tile 546 were used, then inaccuracies would result. For example if the nodes 542 of the larger tile were used for interpolation for the transformation of a red value corresponding to a locations away from the nodes of the larger tiles, then differences in the relationship as seen from the nodes and from the location away from the nodes would result in significant errors. A region between the eight 538 and a ninth red value 550 is moderately variable and is, for example, only moderately important to accurate image representation. Therefore an intermediately sized tile 554 is used in this region. The relatively large size of the tile in this moderately variable region may introduce some small errors. However, since the colors in this region are only somewhat important, small errors are deemed acceptable. A region between the ninth red value 550 and a tenth red value 558 has a fairly constant relationship between red and magenta. Therefore, a large tile is used to represent this region of the first color to second color space relationship.

Figure 6:
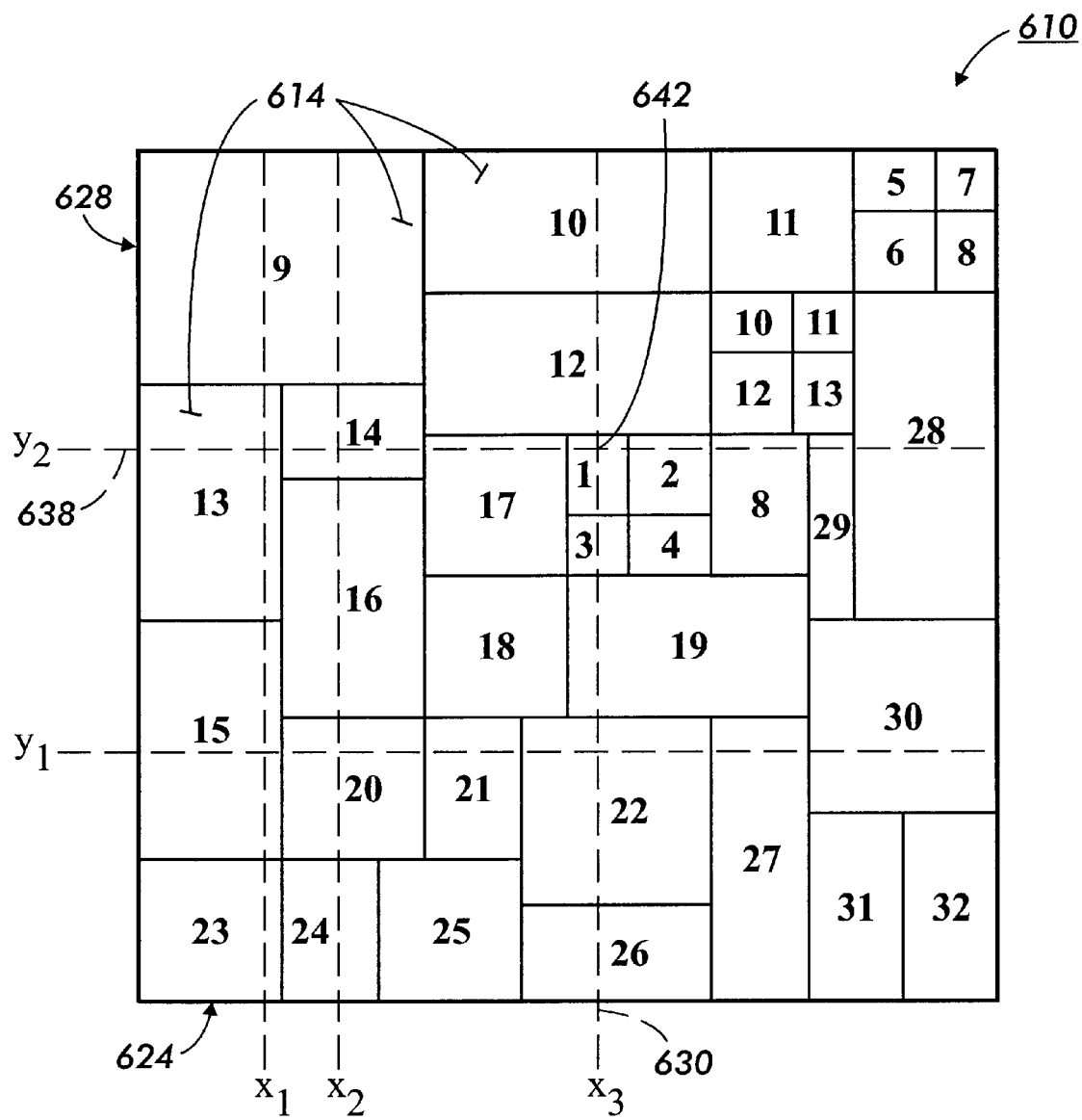
FIG. 6 is a depiction of a portion of a look up table that is not restricted to separable tiling including tile enumeration and showing relationships between particular color space parameter values and particular color space tiles.

Referring now to FIG. 4 and to FIG. 6, after the first color space is subdivided into appropriately sized and shaped tiles, the tiles are enumerated, or tagged with a numerical label in a tile enumeration step 422. For example, referring to FIG. 6, two dimensions of a first color space 610 are shown. Typically the first color space parameter set includes three or more parameters or dimensions. For example, a first color space parameter set contains R, G, B values. Alternatively, a first color space parameter set contains C, M, Y, K values, the parameter values associated with a HI-FI color space, or some other color space. However, those skilled in art will immediately understand how to extrapolate the simplified example into the multi-dimensional cases.

The two-dimensional color space 610 is divided into a plurality of tiles 614. For example, the tiles are non-separable. The tiles are tagged or numbered from one to thirty-two.

In a parameter value association step 426, parameter values of the first color space are associated with tiles in the first color space. For example, parameter value x1 is associated with tile numbers 9, 13, 15 and 23. Parameter value x2 is associated with tile numbers 9, 14, 15 16, 20 and 24. Parameter value x3 is associated with tile numbers 1, 3, 10, 12, 19, 22, and 26. Likewise parameter value y1 is associated with tile numbers 15, 20, 21, 22, 27 and 30. Parameter value y2 is associated with tile numbers 1, 2, 8, 13, 14, 17, 28, and 29. The parameter values are associated with the listed tiles because, for example, the tiles are positioned adjacent to positions of the parameter values on an X parameter axis 624 and a Y parameter axis 628.

In a color selection step 430 a color, pixel, or set of first color space parameter values, is selected for transformation. The color or pixels is selected, for example, from a set of pixels that comprise an input image. For example, the first color space parameter set (x3, y2) is selected for transformation.

In an intersection determination step 434 an intersection of associated tiles is determined. The intersection is found by any number of ways. For example, the intersection is found by inspection. A first line 630 representing parameter value x3 is extended perpendicular to the x-axis 624. A second line 638 representing parameter value y2 is extended perpendicular to the y-axis 628. An intersection 642 of the first line 630 and the second line 638 is located. For example, the intersection 642 of the lines 630, 638 is coincident with tile number 1.

Alternatively, the intersection is found by examining the lists of tile numbers associated with each parameter value. For example, a first list of tile numbers associated with x3: 1,3,10,12,19,22,26 is compared with a second list of tile numbers associated with y2: 1,2,8,13,14,17,28,29. The examination reveals that both lists contain tile number one.

While these methods work well when performed by humans, they are not practical when performed by digital computing devices. An implementation of the intersection determination step 434, that is well suited for use in image processors such as, for example, personal computers configured as image processors, or dedicated document processors, uses bit vectors to record the tile numbers associated with each first color space parameter value. For example, in the case of the thirty-two tile color space of FIG. 6, the bit vectors are thirty-two bits long. The position of each bit corresponds to a tile number. For example, a bit vector corresponding to the tiles associated with color space parameter value x3 is: (1,0,1,0,0,0,0,0,0,1,0,1,0,0,0,0,0,0,1, 0,0,1,0,0,0,1,0,0,0,0,0,0). Similarly, the bit vector corresponding to the tiles associated with color space parameter value y2 is: (1,1,0,0,0,0,0,1,0,0,0,0,1,1,0,0,1,0,0,0,0,0,0,0, 0,0,1,1,0,0,0). The relationship between these vectors and the tile number associations they represent is better understood by examining FIG. 7. In FIG. 7 an x3 bit vector 710 and a y2 bit vector 720 are displayed under a corresponding list of tile numbers 730. Each tile number 730 is displayed over a corresponding bit positions in the vectors 710, 720. A tile association is indicated where positions in the bit vectors 710, 720 have a value of one. Where a tile is not associated with a particular parameter value, a position in that value's bit vector contains zero. For example, in the x3 bit vector 710, bit positions numbered 1,3,10,12,19,22, and 26 hold the value one. All the other bit positions in the x3 bit vector 710 hold the value zero. The bit positions in the x3 bit vector 710 that contain the value one, correspond to tiles associated with parameter value x3. Similarly, in the y2 bit vector 720, bit positions numbered 1,2,8,13,14,17,28 and 29 hold the value one. The bit positions that contain the value one correspond to tiles associated with parameter value y2. A bitwise logical AND operation applied to the first color space parameter bit vectors 710, 720 associated with x3 and y2 generates a tile indicating bit vector 740. The anding operation sets a bit position in the indicating bit vector 740 to the value one when the corresponding positions in the both the x3 and y2 color space parameter value bit vectors 710, 720 contain the value one. For example, the x3 bit vector 710 and the y2 bit vector 720 both hold the value one in bit position one. Furthermore, the first bit position is the only bit position in which both the x3 710 and y2 720 bit vectors contain the value one. Therefore the anding operation, when applied to the x3 and y2 bit vectors 710, 720, generates an indicating bit vector 740 that holds the value one in the first position and holds the value zero in remaining positions two through thirty-two. The indicating bit vector 740 contains a representation of the intersection of the sets of tiles associated with each of the first color space parameter values x3 and y2.

Referring once again to FIG. 4, in a first color space transformation step 438 the indicated intersection tile is used to transform the selected first color space color description or pixel. The first color space transformation step 438 can comprise any color space transformation method. For example, nodes associated with the indicated tile are accessed and second color space parameter values held within those nodes are used directly or interpolated between, in order to generate a second color space description of the selected color or pixel. As explained above, node accessing and transformation rules based on interpolation techniques are known in the art. Alternatively, the indicated tile number is used as an index into a table of other kinds of transformation rules such as, for example, tone reproduction curves, polynomials, algorithms or logical processes. The selected transformation rule is, for example, predefined to be particularly suited to the transformation of colors that are encompassed by the indicated tile. Typically, transformed values are stored and accumulated in an image buffer. As colors or pixels are transformed, the resulting transformation values are stored in the buffer and a second color space version of a first color space source or input images is eventually assembled.

Figure 8:
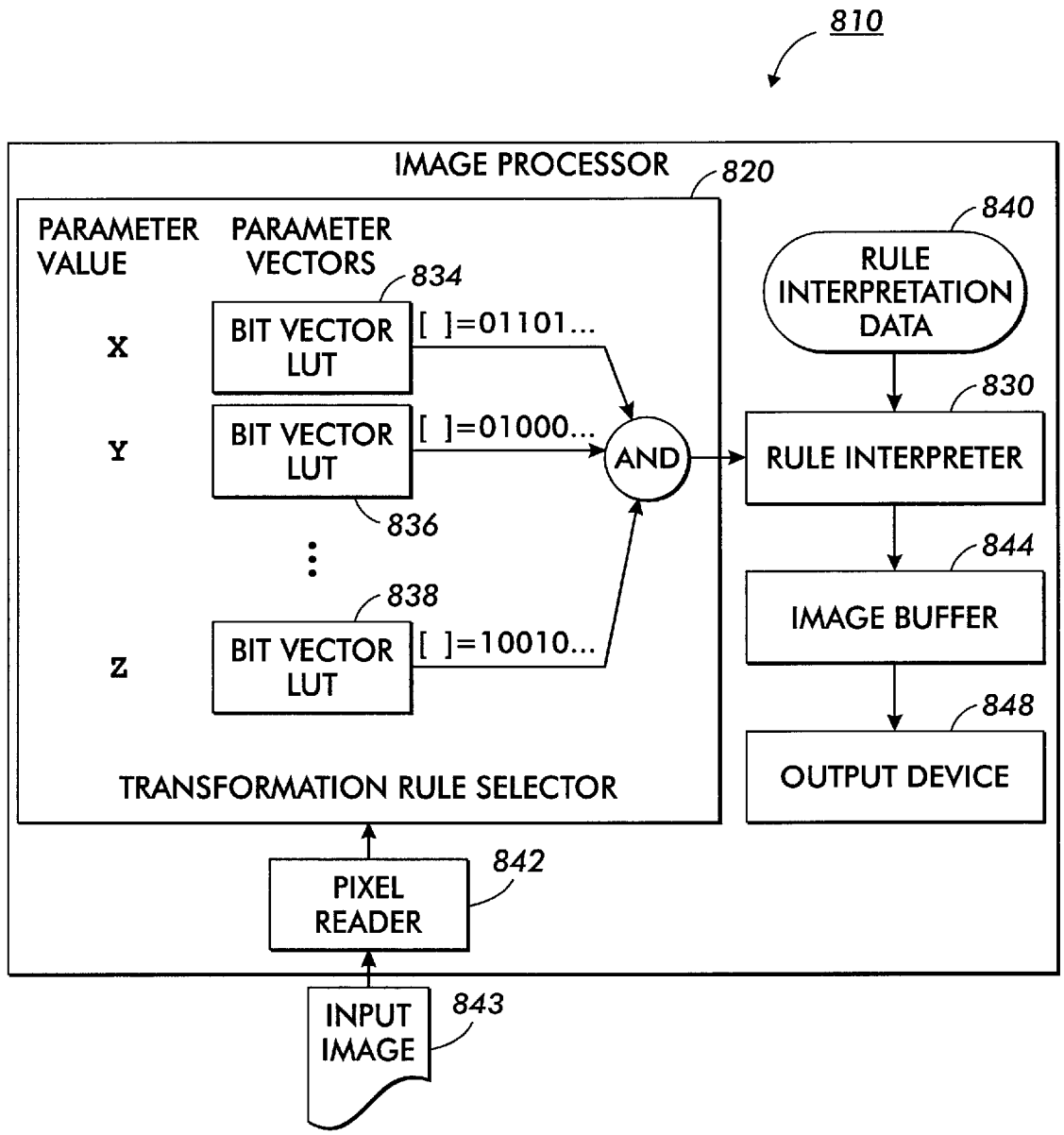
FIG. 8 is a block diagram of an image processor operative to perform the method of FIG. 4.

Referring to FIG. 8, an image processor 810 operative to carry out the high-speed method 410 for using non-separable tiling in color transformations comprises a transformation rule selector 820 and transformation rule interpreter 830. For example, through the use and manipulation of bit vectors 834, 836, 838 associated with first color space parameter values; the transformation rule selector 820 selects a rule for use in transforming a first color space color description into a second color space color description. The transformation rule selector 820 passes rule selection information to the transformation rule interpreter 830. The transformation rule interpreter 830 then interprets and applies the rule to perform the transformation. In embodiments that require it, the transformation rule interpreter has access to rule interpretation data 840.

For example, the image processor 810 works as follows. The relationship examination step 414, color space division step 418, tile enumeration step 422, and parameter value associations step 426, are performed during a period of machine or software design. The result of those steps 414, 418, 422, 426 is, for example, encoded and incorporated in the hardware that comprises a machine, or in software and/or data that is made part of the machine. Alternatively, the software and/or data is made available for installation on a device, such as, for example, a personal computer. For instance, the result of the steps 414, 418, 422, 426 is encoded in the form of a non-separably tiled look up table, in association with bit vectors. The tiles of the table are comprised of nodes. The nodes contain second color space parameter values that are related to the first color space locations of the nodes. Each tile is associated with a unique tag or label. Bit vectors associated with first color space parameter values indicate which tiles and therefore which nodes are related to particular first color space parameter values. When a first color space color description or pixel is selected, for example, by pixel reader 842 examining an input image 843 (in color selection step 430), bit vectors associated with first color space parameter values that comprise the pixel are accessed and manipulated by the transformation rule selector 820. For example, the pixel comprises first color space parameter values x2, y26, z61. The transformation rule selector 820 accesses bit vectors stored within the transformation rule selector in association with those particular first color space parameter values. For example, a first bit vector 834 is associated with a first color space parameter value x2, a second bit vector 836 is associated with a second color space parameter value y26, and a third bit vector 838 is associated with a first color space parameter value z61. Parameters XYZ may correspond, for example, to RGB parameters. In that case parameter values x2, y26, z61 might correspond to a red value of two, a green value of twenty-six and a blue value of sixty-one. Alternatively, there may be more parameters in the first color space and therefore more bit vectors are accessed. For instance, there may be parameters WXYZ corresponding, for example, to CMYK parameters. However many parameters are involved, in the intersection determination step 434, the transformation rule selector 820 determines an intersection of transformation rules associated with the parameter values. For example, the transformation rule selector 820 compares the bit vectors 834, 836, 838 associated with the parameter values and thereby selects or indicates a tile associated with the particular set of parameter values. For example, the transformation rule selector 820 performs a logical AND operation on the bit vectors 834, 836, 838 and generates an intersection-indicating vector (such as 740 of FIG. 7) and passes it to the rule interpreter 830. The rule interpreter 830 then accesses nodes associated with the indicated tile and either uses node information directly or interpolates between the nodes and transforms the first color space color description into a second color space color description. For example, the nodes are stored in a look up table. The look up table comprises at least part of the rule interpretation data 840. Alternatively, instead of accessing nodes, the rule interpreter 830 uses the indicated tile selection as an address or index into some other kind of rule description. For example, the indicated tile selection directs the rule interpreter 830 to use a particular tone reproduction curve, polynomial, or logical expression in the transformation of the first color space color description into a second color space color description. In that case, the rule implementation data 840 comprises a set of tone reproduction curves, polynomials, logical expressions or other transformation rule storage and description mechanism. Typically, the second color space color description is stored in an image buffer 844. For example, the image buffer accumulates second color space color descriptions until a complete second color space description of the first color space image 848 is assembled. Complete second color space image descriptions are typically delivered to an output device 848. For example, the second color space image description is delivered to a mass storage device such as, for example, a disk drive or networked file server. Alternatively, the output device 848 is a display device or a print engine. For example, the output device 848 is a CRT, xerographic printer or a computer printer, such as for example, an ink jet or laser printer.

The invention has been described with reference to particular embodiments. Modifications and alterations will occur to others upon reading and understanding this specification. For example, the tiles have been described as rectangles and hyper-rectangles, however other shapes and hyper-shapes are contemplated. For example, tiles may be irregular in shape. Additionally, the specification may imply that the tiles do not overlap. However, overlapping tiles are contemplated. For example, where tiles overlap, indicating vectors generated for certain combinations of parameter values may indicate that the intersection comprises two or more tiles. In that case transformation rules may be combined, blended or selected between. Where transformation rules or interpolation techniques are discussed, pre-calculation and look up tables may be substituted. Where bit vectors are combined through logical anding, other combination techniques may be used. For example, the sense of the bit vectors may be flipped. Instead of indicating a tile association with the value one, the value zero may be used. Furthermore, unassociated tiles may be indicated by bit locations containing the value one. In that case, combining bit vectors through a logical oring generates an indicating vector wherein bit locations containing the value zero indicate the intersection of the combined bit vectors. Where tiles are shown covering an entire color space, it is contemplated that some embodiments may refrain from completely tiling a color space, thereby leaving voids or null zones where no input or first color space values are expected and where no transformation takes place. Where image processors and personal computers are referred to, other devices, such as, for example, devices comprised of distributed network components may be substituted. It is intended that all such modifications and alterations are included insofar as they come within the scope of the appended claims or equivalents thereof.

What is claimed is:

1. A method operative for transforming a description of a color from a first color space, defined by first color space parameters, into a second color space, defined by second color space parameters, the method comprising:

examining a relationship between the first color space and the second color space;

dividing the first color space into a plurality of tiles, each tile being of a selected size and shape, the size and shape of each tile being based on the examined relationship between the first color space and the second color space, the tiles defined by nodes, the nodes relating parameter values in the first color space to parameters values in the second color space; and enumerating each tile; and, transforming a selected set of first color space parameter values into a corresponding set of second color space parameter values based on an association of the first color space parameter values with particular ones of the enumerated tiles.

2. The method of claim 1 wherein transforming the selected set of first color space parameter values comprises:

associating each respective first color space parameter value with a respective set of enumerated tiles based on locations of the tiles within the first color space and each respective first color space parameter value;

selecting the set of first color space parameter values for transformation into the corresponding set of second color space parameter values;

determining an intersection of respective associated sets of enumerated tiles of the first color space parameter values; and transforming the first color space parameter values into the corresponding set of second color space parameter values as indicated by the intersection of associated sets of enumerated tiles of the first color space parameter values.

3. The method of claim 2 wherein associating each respective first color space parameter value with a respective set of enumerated tiles further comprises associating a particular first color space parameter value with a set of enumerated tiles located adjacent a location of the particular first color space parameter value on a parameter value axis, the parameter value axis at least partially describing the first color space.

4. The method of claim 2 wherein determining an intersection of respective associated sets of enumerated tiles of the first color space parameter values further comprises anding bit vectors describing the associated sets.

5. The method of claim 2 wherein transforming the first color space parameter values into the corresponding set of second color space parameter values as indicated by the intersection of associated sets further comprises:

interpolating between nodes of a tile addressed by the intersection of the associated sets.

6. The method of claim 1 wherein dividing the first color space into a plurality of tiles further comprises dividing the first color space into a plurality of tiles, based on changes in the examined relationship between the first color space and the second color space as one moves from point to point within the first color space.

7. The method of claim 1 wherein dividing the first color space into a plurality of tiles further comprises dividing the first color space into small tiles where the relationship between the first color space and the second color space changes quickly.

8. The method of claim 1 wherein dividing the first color space into a plurality of tiles further comprises dividing the first color space into large tiles where the relationship between the first color space and the second color space changes slowly.

9. The method of claim 1 wherein dividing the first color space into a plurality of tiles further comprises dividing the first color space into relatively small tiles where a high degree of transformation accuracy is desired.

10. The method of claim 1 wherein dividing the first color space into a plurality of tiles further comprises dividing the first color space into relatively large tiles where a lower degree of transformation accuracy can be tolerated.

11. The method of claim 10 wherein interpolating further comprises:

using tetrahedral interpolation between nodes of the tile addressed by the intersection of the associated sets.

12. An image processor operative to transform a first image description, based in a first color space, described by a set of first color space parameters, into a second image description, based in a second color space, described by a set of second color space parameters, the image processor comprising:

a set of image transformation rules;

a set of image transformation rule association vectors, each image transformation rule association vector related to a particular first color space parameter value, each image transformation rule association vector identifying particular image transformation rules of the set of transformation rules associated with the particular first color space parameter value;

an image transformation rule selector operative to use rule association vectors associated with a given set of first color space parameter values to find an intersection of image transformation rules associated with the given set of first color space parameter values and to thereby select an image transformation rule for execution based on the found intersection.

13. The image processor of claim 12 further comprising an image transformation rule interpreter operative to execute the selected image transformation rule, thereby transforming the set of first color space parameter values into a related set of the second color space parameter values.

14. The image processor of claim 12 further comprising an image buffer operative to accumulate the second image description from transformations of a plurality of sets of first color space parameter values.

15. The image processor of claim 14 further comprising an output device operative to generate an image based on the contents of the image buffer.

16. The image processor of claim 15 wherein the output device comprises a print engine.

17. The image processor of claim 16 wherein the print engine comprises a xerographic printer.

18. The image processor of claim 15 wherein the output device comprises a CRT.

19. The image processor of claim 12 wherein the transformation rules are described as algorithms for interpolation between nodes.

20. The image processor of claim 12 wherein the transformation rules further comprise tetrahedral interpolation rules.

21. A method operative for transforming a description of a color from a first color space defined by first color space parameters to a second color space defined by second color space parameters, the method comprising:

examining a relationship between the first color space and the second color space;

creating a set of transformation rules based on the examination, respective rules in the set being operative over respective regions of the first color space;

associating respective bit positions in a rule association vector template with the respective regions;

associating respective first color space parameter values with respective rule association vectors;

setting bits in respective rule association vectors according to the bit position rule associations of the rule association vector template and associations of respective first color space parameter values with the regions of the first color space;

selecting an image pixel describing a color in terms of a particular set of first color space parameter values for transformation into an image pixel describing the color in terms of a particular set of second color space parameter values;

determining an intersection of rule association vectors of the particular set of first color space parameter values; and transforming the first color space parameter values into a set of second color space parameter values by following at least one transformation rule indicated by the intersection of rule association vectors.

22. The method of claim 21 wherein creating a set of transformation rules further comprises creating a set of transformation rules based on an interpolation between nodes.

23. The method of claim 21 wherein determining an intersection further comprises anding the rule association vectors of the particular set of first color space parameter values.

* * * * *